US008565478B2

(12) United States Patent
van Eekeren et al.

(10) Patent No.: US 8,565,478 B2
(45) Date of Patent: Oct. 22, 2013

(54) METHOD OF IMPROVING THE RESOLUTION OF A MOVING OBJECT IN A DIGITAL IMAGE SEQUENCE

(75) Inventors: Adam Wilhelmus Maria van Eekeren, The Hague (NL); Klamer Schutte, Zoetermeer (NL); Lucas Jozef van Vliet, Schiedam (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 269 days.

(21) Appl. No.: 12/837,299

(22) Filed: Jul. 15, 2010

(65) Prior Publication Data
US 2011/0081046 A1    Apr. 7, 2011

(30) Foreign Application Priority Data

Jan. 18, 2008  (EP) .................................... 08150423
Jul. 25, 2008  (EP) .................................... 08161222

(51) Int. Cl.
*G06K 9/00*    (2006.01)
(52) U.S. Cl.
USPC ......................................................... 382/103
(58) Field of Classification Search
USPC ......... 382/103, 167, 243; 250/208.1; 348/155
See application file for complete search history.

(56) References Cited

U.S. PATENT DOCUMENTS

| 6,795,567 | B1 * | 9/2004 | Cham et al. ................... 382/103 |
| 7,574,038 | B1 * | 8/2009 | Cohen et al. .................. 382/163 |
| 2003/0213892 | A1 * | 11/2003 | Zhao et al. ................. 250/208.1 |
| 2003/0231769 | A1 | 12/2003 | Bolle |
| 2005/0104964 | A1 * | 5/2005 | Bovyrin et al. ............... 348/155 |
| 2006/0123245 | A1 | 6/2006 | Avidan |
| 2006/0159369 | A1 * | 7/2006 | Young ........................... 382/299 |
| 2008/0131022 | A1 * | 6/2008 | Vitsnudel et al. ............. 382/274 |

FOREIGN PATENT DOCUMENTS

EP    1796048    6/2007

* cited by examiner

*Primary Examiner* — Amara Abdi
(74) *Attorney, Agent, or Firm* — William J. McNichol, Jr.; Reed Smith LLP

(57) ABSTRACT

A method of improving the resolution of a small moving object in a digital image sequence comprises the steps of:
constructing (101) a high-resolution image background model,
detecting (102) the moving object using the high-resolution image background model,
fitting (103) a model-based trajectory for object registration, and
producing (104) a high-resolution object description.
The step of producing a high-resolution object description involves an iterative optimization of a cost function (109) based upon a polygonal model of an edge of the moving object. The cost function is preferably also based upon a high resolution intensity description. The iterative optimization of the cost function may involve a polygon description parameter and/or an intensity parameter.

18 Claims, 9 Drawing Sheets

Figure 1:
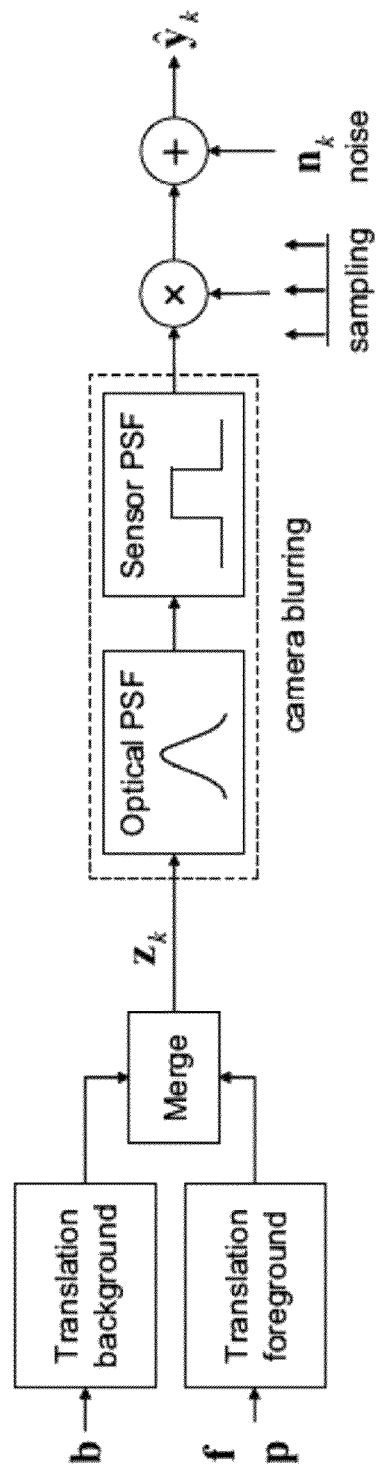

(a) LR reference frame (64 64 pixels).

(b) Result after 4 x SR using our proposed method (c) Zoom in on moving object in (a).

(d) Zoom in on moving object in (b).

(a) 4x SR result.

(b) Object 4x closer to camera.

METHOD OF IMPROVING THE RESOLUTION OF A MOVING OBJECT IN A DIGITAL IMAGE SEQUENCE

This application is a continuation of copending application PCT/NL2009/050024, filed Jan. 19, 2009, which claims the priority of applications EP 08150423.5, filed Jan. 18, 2008, and EP 08161222.8, filed Jul. 25, 2008.

The present invention relates to a method of improving the resolution of a moving object in a digital image sequence. More in particular, the present invention relates to a method of improving the resolution of a small moving object in a digital image sequence, the object consisting mainly or exclusively of boundary pixels.

In many image processing applications the most interesting events are related to changes occurring in the scene: e.g. moving persons or moving objects. In this document we focus on multi-frame Super-Resolution (SR) reconstruction of small moving objects, i.e. objects that are comprised mainly, or even solely, of boundary pixels, in undersampled image sequences. These so-called 'mixed pixels' depict both the foreground (the moving object) and the local background of a scene. Especially for small moving objects, resolution improvement is useful. Multi-frame SR reconstruction improves the spatial resolution of a set of sub-pixel displaced Low-Resolution (LR) images by exchanging temporal information for spatial information.

The concept of SR reconstruction has already been in existence for more than 20 years, as evidenced by the paper by R. Y. Tsai and T. S. Huang: "Multiframe image restoration and registration," in *Advances in Computer Vision and Image Processing*, JAI Press, 1984, vol. 1 pp. 317-339. However, only little attention is given to SR reconstruction on moving objects. This subject has been addressed in, for example, the paper by A. W. M. van Eekeren, K. Schutte, J. Dijk, D. J. J. de Lange, and L. J. van Vliet: "Super-resolution on moving objects and background," *Proc. IEEE 13th International Conference on Image Processing (ICIP '06)*, vol. 1, 2006, pp. 2709-2712. Another publication addressing SR reconstruction is the paper by M. Ben-Ezra, A. Zomet, and S. K. Nayar: "Video super-resolution using controlled sub-pixel detector shifts," *IEEE Trans. Pattern Anal. Mach. Intell.*, vol. 27, no. 6, pp. 977-987, 2005.

Some Prior Art techniques, such as the one disclosed in the paper by Ben-Ezra et al., apply different SR reconstruction methods, for example iterated-back-projection or projection onto convex sets, while having the use of a validity map in their reconstruction process in common. This makes these methods robust to motion outliers. These known methods perform well on large moving objects (the number of mixed pixels is small in comparison to the total number of object pixels) with a simple motion model, such as translation. Other Prior Art techniques use optical flow to segment a moving object and subsequently apply SR reconstruction to it. In these known techniques, the background is static and SR reconstruction is done solely on a masked large moving object.

In the article by Van Eekeren et al. mentioned above an algorithm was presented that performs, after segmentation, simultaneously SR reconstruction on a large moving object and background using a Prior Art SR reconstruction technique. However, in the article no SR reconstruction is applied to the boundary (mixed pixels) of the moving object because of a cluttered background.

In the paper by F. W. Wheeler and A. J. Hoogs: "Moving vehicle registration and super-resolution," *Proc. IEEE Applied Imagery Pattern Recognition Workshop(AIPR '07)*, 2007, super-resolution reconstruction is performed on moving vehicles of approximately 10 by 20 pixels. For object registration a trajectory model is used in combination with consistency of local background and vehicle. However, in this known SR reconstruction approach no attention is given to mixed pixels. An interesting subset of moving objects are faces. In Prior Art techniques in that area which use SR reconstruction the modelling of complex motion is a key element. However, the faces in the used LR input images are far larger than the small objects addressed by the present invention.

When a moving object is small (that is, when it consists mainly or even solely of mixed pixels) and the background is cluttered, even the most advanced pixel-based SR reconstruction methods of the Prior Art will fail. Any pixel-based SR reconstruction method makes an error at the object boundary, because it is unable to separate the space-time variant background and foreground information within a mixed pixel.

U.S. Pat. No. 7,149,262 (Columbia University) discloses a resolution enhancement algorithm for obtaining a polynomial model mapping of low resolution image data to high resolution image data. However, said patent fails to mention super-resolution and hardly mentions moving objects, and is therefore incapable of suggesting an improved SR reconstruction method.

European Patent Application EP 1 923 834 (TNO), published on 21 May 2008, discloses a method for detecting a moving object in a sequence of images captured by a moving camera. The method comprises the step of constructing a multiple number of different images by subtracting image values in corresponding pixels of multiple pairs of images. One image is a representation of a high-resolution image having a higher spatial resolution than the original captured images. This known method does not concern the identification of a moving object, only its detection.

It is an object of the present invention to overcome these and other problems of the Prior Art and to provide a method of improving the resolution of a moving object in a digital image sequence, which method has an improved resolution at the object boundary, in particular when the object consists mainly, or even entirely, of boundary pixels.

To solve the above-mentioned problems the present invention proposes to perform SR reconstruction on small moving objects using a simultaneous boundary and intensity estimation of a moving object. Assuming rigid objects that move with constant speed through the real world, a proper registration is done by fitting a trajectory through the object's location in each frame. The boundary of a moving object is modelled with a sub-pixel precise polygon and the object's intensities are modelled on a High-Resolution (HR) pixel grid.

More in particular, the present invention provides a method of improving the resolution of a moving object in a digital image sequence, the method comprising the steps of:
constructing a high resolution image background model,
detecting the moving object using the high resolution image model,
registering the object, and
producing a high-resolution object description,
wherein the step of producing a high-resolution object description involves an iterative optimisation of a function based upon an edge model of the moving object.

By using an iterative optimisation of a function and a polygonal model of the (edge of the) moving object, it is possible to produce an accurate high-resolution object description, and thereby to accurately identify the object.

The function also be based upon a high resolution intensity description, and preferably is a cost function. It is further preferred that the high-resolution object description comprises a sub-pixel accurate boundary and/or a high-resolution intensity description. The step of registering the object preferably involves a model-based object trajectory.

The step of producing a high-resolution object description may involve solving an inverse problem. Advantageously, the high resolution image background may be estimated using a pixel-based super-resolution method.

In a particularly advantageous embodiment, the iterative optimisation of a cost function involves a polygonal description parameter and/or an intensity parameter. The edge model preferably is a polygonal edge model.

In a further embodiment, the method of the present invention may comprise the further steps of:
- subjecting the high-resolution object description to a camera model to produce a low resolution modelled image sequence,
- producing a difference sequence from a registered image sequence and the modelled image sequence,
- feeding the difference sequence to the cost function, and
- minimising the cost function to produce the next iteration of the polygon description parameter and/or an intensity parameter.

Advantageously, the function may comprise a regularisation term for regulating the amount of intensity variation within the object, preferably according to a bilateral total variation criterion.

A preferred embodiment of the method of the present invention can be summarised as follows. After applying SR reconstruction to the background, the local background intensities are known on an FIR grid. When the intensities of the moving object and the position of the edges of the boundary are known as well, the intensities of the mixed pixels can be calculated. By minimizing the model error between the measured intensities and the estimated intensities, a sub-pixel precise boundary and an intensity description of the moving object are obtained.

Especially for small moving objects the approach of the present invention improves the recognition significantly. However, the use of the inventive SR reconstruction method is not limited to small moving objects. It can also be used to improve the resolution of boundary regions of larger moving objects. This might give an observer some useful extra information about the object.

The present invention also provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

The present invention additionally provides a device for improving the resolution of a moving object in a digital image sequence, the device comprising:
- an image background unit for constructing a high resolution image background model,
- a detection unit for detecting the moving object using the high resolution image background model,
- a registering unit for registering the object, and
- an object description unit for producing a high-resolution object description, wherein the object description unit is arranged for performing an iterative optimisation of a cost function based upon an edge model of the moving object. The edge model preferably is a polygonal model, while the registering unit preferably applies a model-based object trajectory.

The present invention further provides a system comprising a device as defined above, which system is a radar system, an infra-red detection system, a medical system such as an NMR system or echoscopy system, an alarm system, a vehicle alert system, or a gaming system.

The present invention will further be explained below with reference to exemplary embodiments illustrated in the accompanying drawings, in which:

FIG. 1 schematically shows a flow diagram of the construction of a 2D HR scene $z_k$ at frame k and the degradation to an LR frame $\hat{y}_k$ via a camera model.

Figure 2:
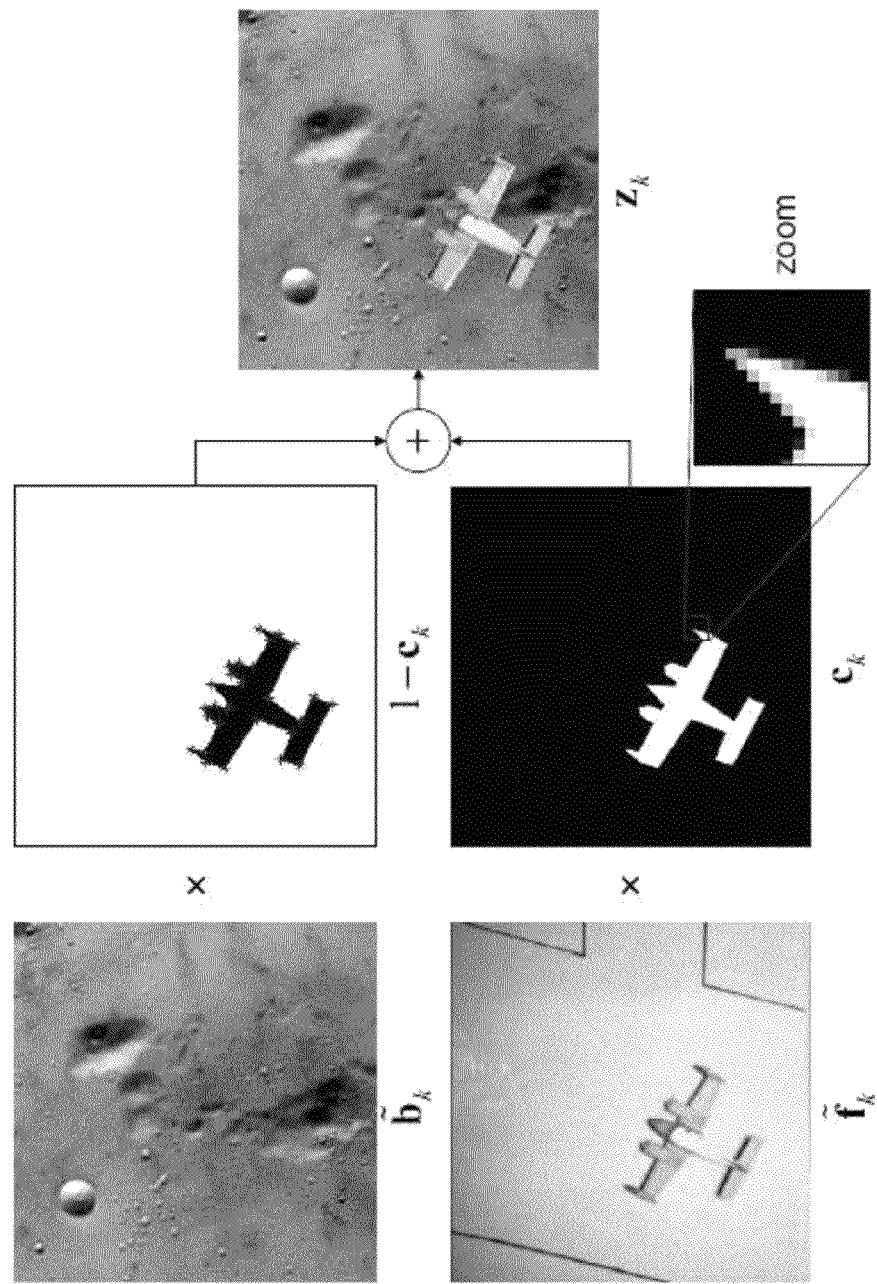

FIG. 2 schematically shows a flow diagram of the merging of foreground and background to obtain HR image $z_k$.

Figure 3:
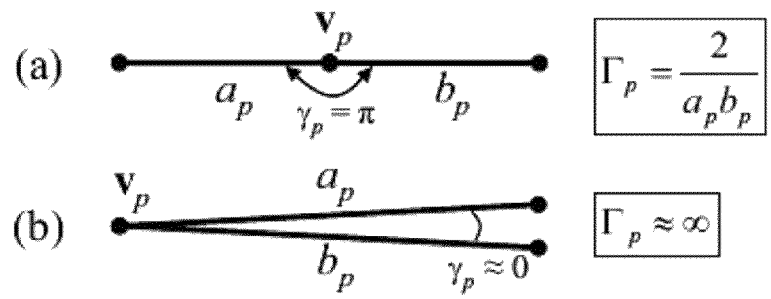

FIG. 3 schematically shows two examples of the calculation of the measure $\Gamma_p$ at vertex $v_p$ of polygon p.

Figure 4:
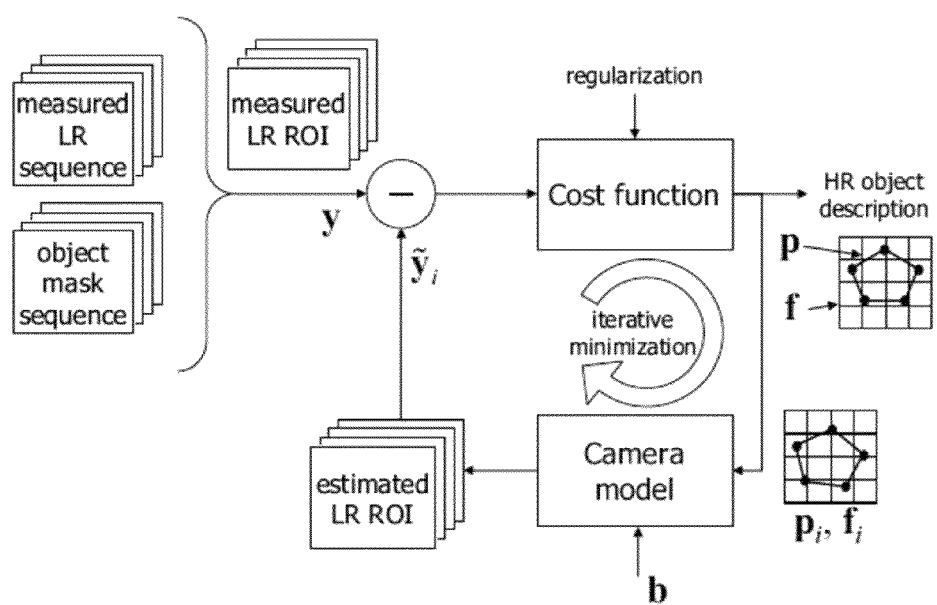

FIG. 4 schematically shows a flow diagram of estimating a high-resolution description of a moving object (p and f).

Figure 5:
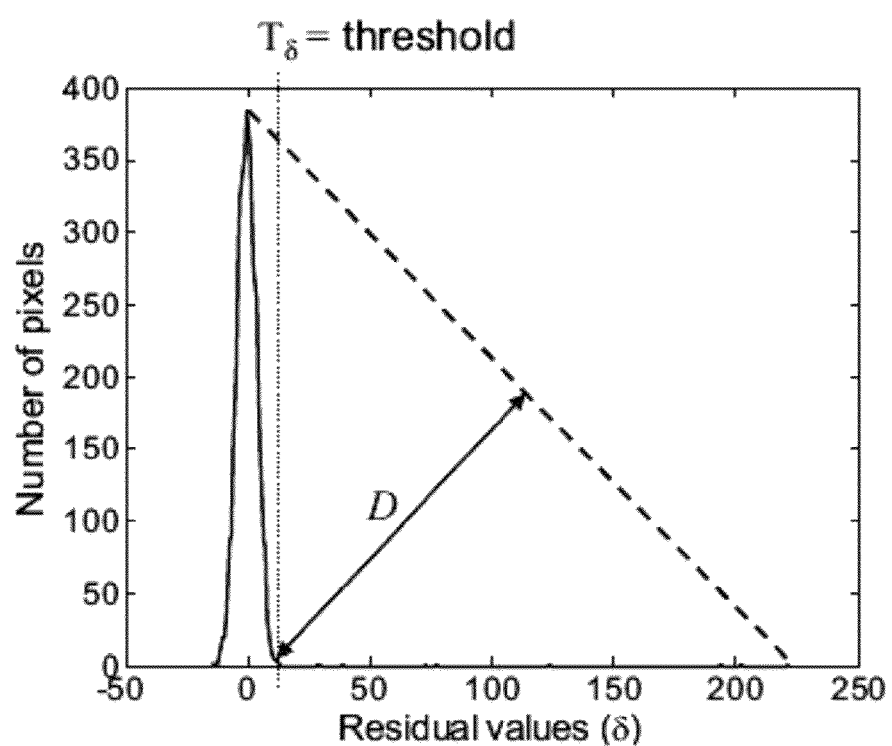

FIG. 5 schematically shows the chord method for finding the value of $\delta$ that gives the maximum distance D, the value $T_\delta$ being used as a threshold value.

Figure 6:
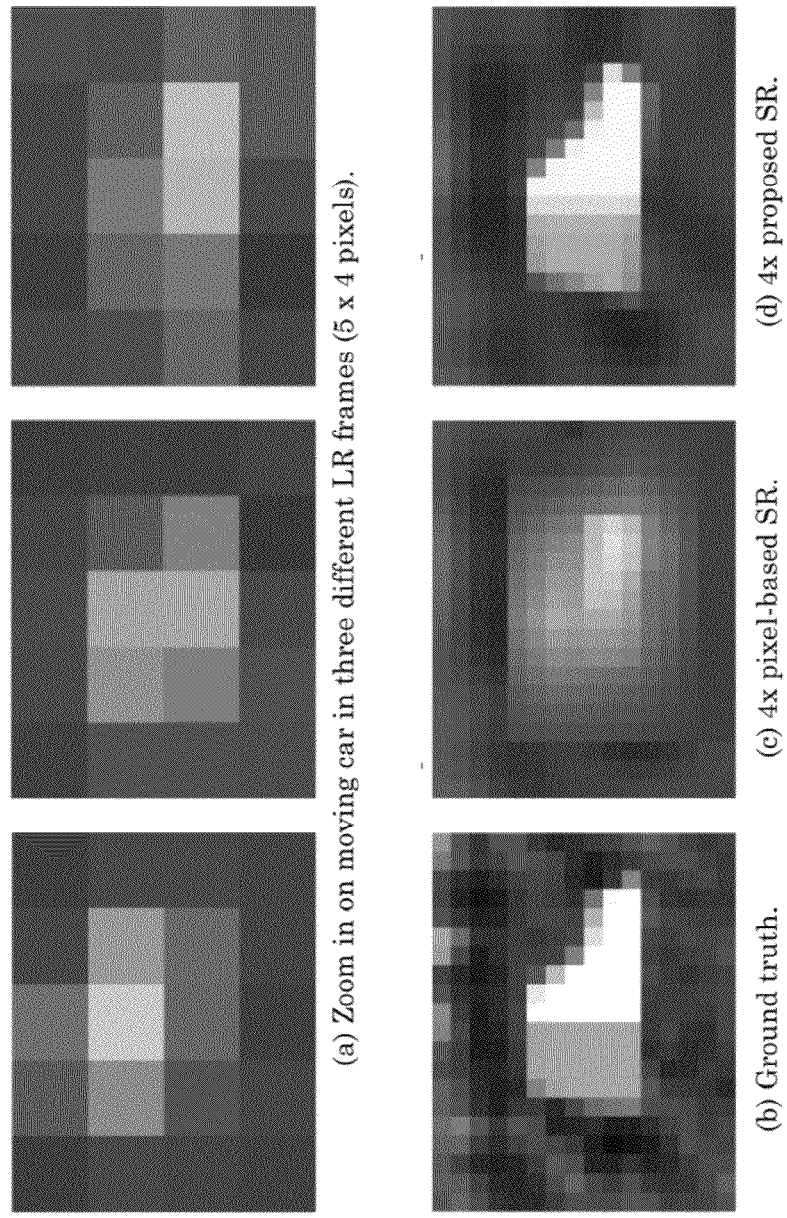

FIG. 6 schematically shows four times SR reconstruction of a simulated under-sampled image sequence containing a small moving car.

Figure 7:
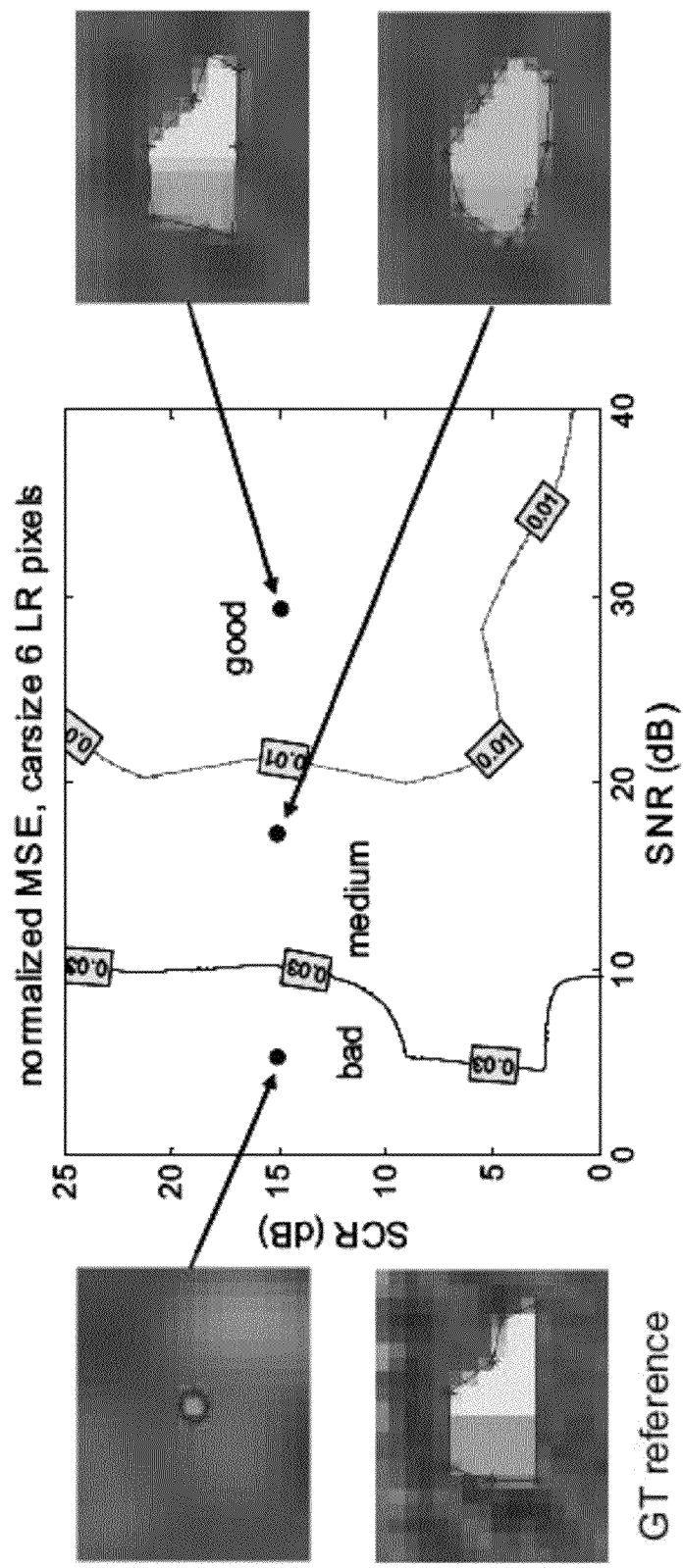

FIG. 7 schematically shows the quantitative performance (normalised MSE) of the SR reconstruction method of the present invention on a simulated image sequence containing a moving car (6 pixels) for varying SNR and SCR.

Figure 8:
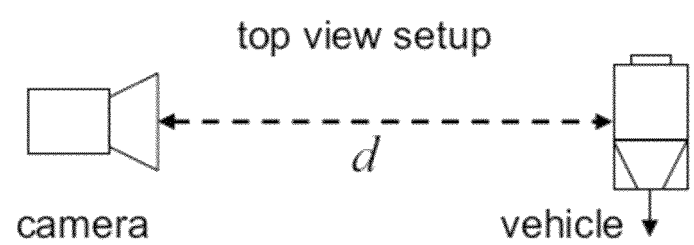

FIG. 8 schematically shows a top view of the set-up for capturing real-world data.

Figure 9:
Figure 9:
Figure 9:
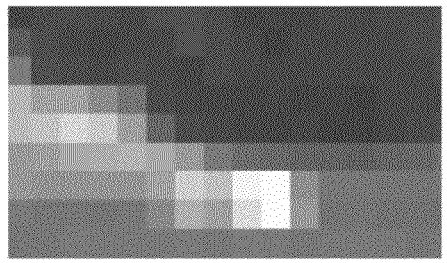
Figure 9:
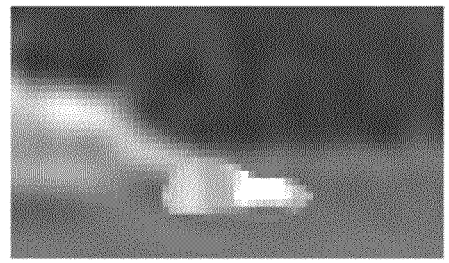

FIG. 9 schematically shows four times SR resolution of a vehicle captured by an infrared camera (50 frames) at a large distance.

Figure 10:
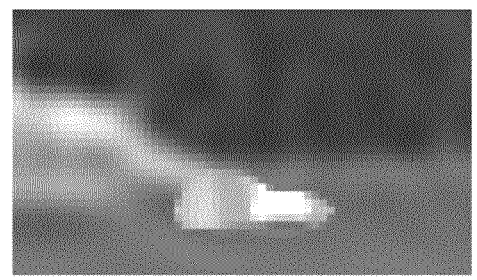
Figure 10:

FIG. 10 schematically shows a four times SR result of a vehicle compared with the same vehicle at a four times smaller distance.

Figure 11:
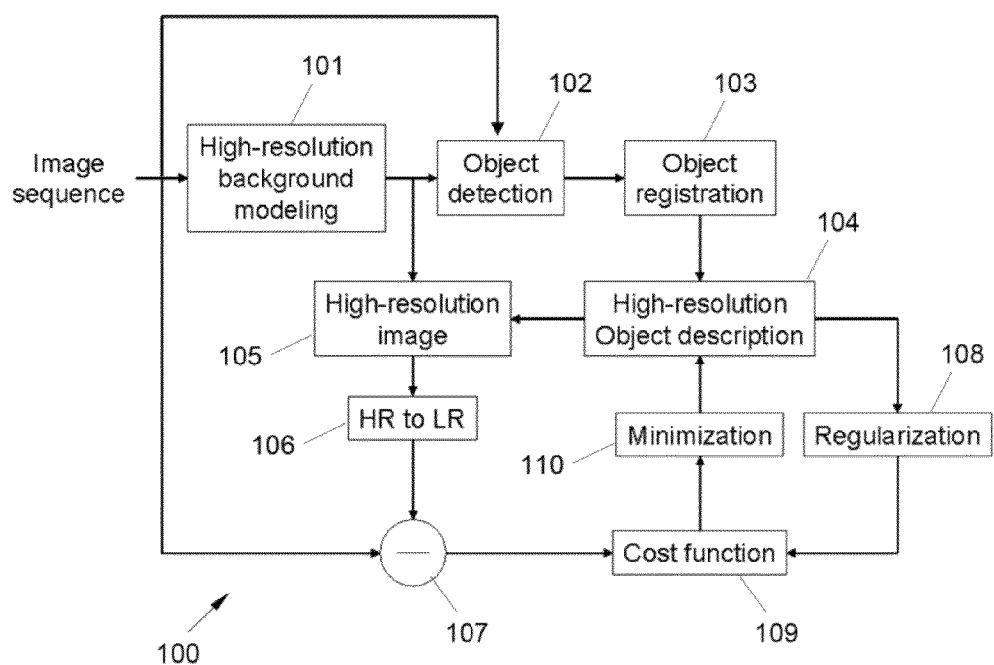

FIG. 11 schematically shows a preferred embodiment of a system according to the present invention.

By way of example, a model of the real world on a two-dimensional (2D) High-Resolution (HR) grid will be described. In addition, it will be described how this is observed by an optical camera system.

2D High-Resolution Scene

A camera's field-of-view at frame k is modelled as a 2D HR image, consisting of R pixels, sampled at or above the Nyquist rate without significant degradation due to motion, blur or noise. Let us express this image in lexicographical notation as the vector $z_k = [z_{k,1}, \ldots, z_{k,R}]^T$. The vector $z_k$ is constructed from a translated HR background intensity description $b = [b_1, \ldots, b_V]^T$, consisting of V pixels, and a translated HR foreground intensity description $f = [f_1, \ldots, f_Q]^T$, consisting of Q pixels. This is depicted in the left part of FIG. 1. Note that the foreground f has a different apparent motion with respect to the camera than the background b. The foreground (small moving object) is not solely described by its intensity description f, but also by a sub-pixel precise polygon boundary $p = [v_{1x}, v_{1y}, \ldots, v_{Px}, v_{Py}]^T$ with P being the number of vertices. The following assumptions are made about a moving object: 1) the aspect angle of the object stays the same and 2) the object is moving at constant speed. These are realistic assumptions given the high frame rate of today's image sensors, in particular if a moving object is far away.

At frame k the HR background and the HR foreground are translated and merged to the 2D HR image $z_k$ in which the $r^{th}$ pixel is defined by:

$$z_{k,r} = c_{k,r}(p)\tilde{f}_{k,r} + (1 - c_{k,r}(p))\tilde{b}_{k,r} \qquad (1)$$

$$= c_{k,r}(p)\sum_{q=1}^{Q} t_{k,r,q} f_q + (1 - c_{k,r}(p))\sum_{v=1}^{V} s_{k,r,v} b_v,$$

for k=1, 2, ..., K and r=1, 2, ..., R. Here, K is the number of frames. The summation of weights $t_{k,r,q}$ represent the translation of foreground pixel $f_q$ to $\sim f_{k,r}$ by bilinear interpolation and in a similar way the summation of $s_{k,r,v}$ translates background pixel $b_v$ to $\sim b_{k,r}$. The weight $c_{k,r}$ represents the foreground contribution at pixel r in frame k depending on the polygon boundary p. The foreground contribution varies between 0 and 1, so the corresponding background contribution is then by definition equal to $(1-c_{k,r})$. A visualization of merging the translated background, $\sim b_k = [b_{k,1}, \ldots, b_{k,R}]^T$, and the translated foreground, $\sim f_k = [f_{k,1}, \ldots, f_{k,R}]^T$, is depicted in FIG. 2. The polygon boundary p defines the foreground contributions $c_k$ and the background contributions $(1-c_k)$ in HR frame k.

Camera Model

Using the 2D HR image $z_k$, the LR camera frame $\hat{y}_k$ is constructed by applying the physical properties of an optical camera system:

Blurring: The optical Point-Spread-Function (PSF), together with the sensor PSF, will cause a blurring at the image plane. In this document the optical blur is modelled by a Gaussian function with standard deviation $\sigma_{psf}$. The sensor blur is modelled by a uniform rectangular function representing the fill-factor of each sensor element. A convolution of both functions represents the total blurring function.

Sampling: The sampling as depicted in FIG. 1 relates to the sensor pitch.

Noise: The temporal noise in the recorded data is modelled by additive, independent and identically distributed Gaussian noise samples $n_k$ with standard deviation $\sigma_n$. For the recorded data used, independent additive Gaussian noise is a sufficiently accurate model. Other types of noise, like fixed pattern noise and bad pixels, are not modelled explicitly.

All in all, the observed $m^{th}$ LR pixel from frame k is modelled as follows:

$$\hat{y}_{k,m} = \sum_{r=1}^{R} w_{k,m,r} z_{k,r} + \eta_{\sigma_n} = \tilde{y}_{k,m} + \eta_{\sigma_n}. \qquad (2)$$

for k=1, 2, ..., K and m=1, 2, ..., M. Here, M is the number of LR pixels in $\hat{y}_k$. The weight $w_{k,m,r}$ represents the contribution of HR pixel $z_{k,r}$ to estimated LR pixel $\hat{y}_{k,m}$. Each contribution is determined by the blurring and sampling of the camera. $\eta_{\sigma_n}$ represents an additive, independent and identically distributed Gaussian noise sample with standard deviation $\sigma_n$.

SR Method

In this section the method to perform SR reconstruction on small moving objects based on the inversion of the forward model of the previous section will be presented. A preferred embodiment of the method of the present invention can be split into three parts:

1) constructing an HR background and detecting the moving object, 2) fitting a trajectory model to the detected instances of the moving object through the image sequence to obtain sub-pixel precise object registration, and 3) obtaining an HR object description, containing a sub-pixel precise boundary and an HR intensity description, by solving an inverse problem.

High-Resolution Object Reconstruction

To find an optimal HR object description (consisting of a polygon boundary p and an intensity description f), the following cost function may be minimized:

$$C_{p,f} = \frac{1}{KM\sigma_n^2} \sum_{k=1}^{K} \sum_{m=1}^{M} (y_{k,m} - \tilde{y}_{k,m}(p,f,b))^2 + \qquad (3)$$

$$\frac{\lambda_f}{Q} \sum_{h,v=\{0,1\}}^{h+v=1} \|f - S_x^h S_y^v f\|_H + \lambda_p \left(\frac{\|p\|}{P}\right)^2 \sum_{p=1}^{P} \Gamma_p(p).$$

where the first summation term represents the normalized data misfit contributions for all pixels k, m.

Normalization is performed with the total number of LR pixels and the noise variance. Here, $y_{k,m}$ are the measured intensities of the observed LR pixels and $\hat{y}_{k,m}$ are the corresponding estimated intensities obtained using the forward model mentioned above. Although the estimated intensities $\hat{y}_{k,m}$ are also dependent on the background b, only p and f are varied to minimize (3). The HR background b is estimated in advance as will later be described in more detail.

Minimization of (3) is an ill-posed problem, therefore regularization is applied to the foreground intensities and to the polygon boundary. The second term of the cost function $C_{p,f}$ regularizes the amount of intensity variation within the object according to a criterion similar to the Total Variation (TV) criterion [12]. Here, $S^h_x$ is the shift operator that shifts f by h pixels in horizontal direction and $S^v_y$ shifts f by v pixels in vertical direction.

The actual minimization of the cost function is done in an iterative way with the Levenberg-Marquardt algorithm, which is well known. This optimization algorithm assumes that the cost function has a first derivative that exists everywhere. However, the L1-norm used in the TV criterion does not satisfy this assumption. Therefore the hyperbolic norm ($\|\cdot\|_H$) is introduced:

$$\|x\|_H = \sum_i \left(\sqrt{x_i^2 + \alpha^2} - \alpha\right) \qquad (4)$$

This norm has the same properties as the L1-norm for large values ($x_i \gg \alpha$) and it has a first (and second) derivative that exists everywhere. For the experiments performed $\alpha=1$ is used.

The third term regularizes the variation of the polygon boundary p. Regularization is needed to penalize unwanted protrusions, such as spikes, which cover a very small area compared to the total object area. This constraint is embodied by the measure $\Gamma_p$, which is small when the polygon boundary p is smooth:

$$\Gamma_p = 1/A_p \text{ with } A_p = 0.5 a_p b_p \sin(\gamma_p/2). \qquad (5)$$

$\Gamma_p$ is the inverse of $A_p$, which is the area spanned by the edges ($a_p$ and $b_p$) at vertex $v_p$ and half the angle between those edges $\gamma_p/2$ as indicated by the right part of (5).

From example (a) in FIG. 3 it is clear why the area is calculated with half the angle $\gamma_p/2$: if we would take the full angle $\gamma_p$, $A_p$ would be zero, which would result in $\Gamma_p = \infty$. Example (b) shows that the measure $\Gamma_p$ will be very large for small angles. Note that this measure is large as well for $\gamma_p \approx 2\pi$ (inward pointing spike).

Note that in (3) normalization is performed on $\Gamma_p$ with the square of the mean edge length $(\|p\|/P)^2$, with P the number of vertices and $\|p\|$ the total edge length of p. This normalization prevents extensive growth of edges in order to minimize $\Gamma_p$.

As mentioned above, the actual minimization of the cost function is performed in an iterative way with the Levenberg-Marquardt (LM) algorithm [13]. To allow this, we put the cost function in (3) in the LM framework, which expects a format like $\min_\beta \mathrm{sum}_i(x_i - \sim x_i(\beta))^2$ where $x_i$ is the measurement and $\sim x_i(\beta)$ is the estimate depending on parameter $\beta$.

In a straightforward case a vector with all residual values, e.g. $[\ldots, (x_i - \sim x_i), \ldots]$, forms the input of the LM algorithm. In our case it is slightly more complex to construct such a vector, which looks like:

$$\left[ \ldots, \overbrace{\frac{1}{\sqrt{KM}\,\sigma_n}(y_{k,m} - \tilde{y}_{k,m})}^{KM}, \ldots, \overbrace{\sqrt{\frac{\lambda_f}{Q}}\left(\sqrt{(f_i - f_j)^2 + \alpha^2} - \alpha\right)}^{2Q}, \ldots, \ldots, \overbrace{\frac{\|p\|}{P}\sqrt{\lambda_p \Gamma_p}}^{P}, \ldots \right]. \qquad (6)$$

with the letters on top indicating the number of elements used in each part of the cost function, which makes the total size of this vector $[1\times(KM+2Q+P)]$.

The cost function in (3) is iteratively minimized to find simultaneously an optimal p and f. A flow diagram of this iterative minimization procedure in steady state is depicted in FIG. 4. Here the Cost function is defined in (3) and the Camera model is defined in (1) and (2). Note that the measured data used for the minimization procedure is a small Region Of Interest (ROI) around the moving object in each frame.

The optimization scheme depicted in FIG. 4 is initialized with an object boundary $p_0$ and an object intensity description $f_0$. These can be obtained in several ways; we have chosen to use a simple and robust initialization method. The initial object boundary is obtained by first calculating the median (frame-wise) width and the median (frame-wise) height of the mask in the object mask sequence. Afterwards we construct an ellipse object boundary with the previous calculated width and height. At initialization the vertices are evenly distributed over the ellipse. The number of vertices is fixed during minimization.

For initializing the object intensity distribution $f_0$, a homogeneous intensity is assumed. This intensity is initialized with the median intensity over all masked pixels in the measured LR sequence. Furthermore, the optimization procedure is performed in two steps. The first step consists of the initialization described above and 5 iterations of the LM algorithm. After this step it is assumed that the found object boundary and intensity description are approaching the global minimum. However, to improve the estimation of the object intensities near the object boundary, a second initialization step is proposed. In this step all intensities of HR foreground pixels ($f_s$) which are close to and located completely within the object boundary are propagated outwards. Afterwards, 15 more iterations of the LM algorithm are performed to let p and f converge.

Background SR Reconstruction and Moving Object Detection

The detection of moving objects is based on the assumption that a moving object deviates from a static background. It has been shown that for an LR image sequence containing a moving point target, a robust pixel-based SR reconstruction method is effective in estimating an HR background and detecting the moving point target. The same approach is applied to the case of small moving objects. However, the relative motion compared to the background must be sufficient given the number of frames. Assuming K LR frames containing a moving object of width W (LR pixels), the apparent lateral translation must be more than 2(W+1)/K LR pixels/frame for a proper background reconstruction.

In the scientific literature several robust SR reconstruction methods are described. In the present invention, the method developed by Zomet et al. is used, which method is robust to intensity outliers, such as small moving objects. This method, which has been described in the paper by A. Zomet, A. Rav-Acha, and S. Peleg, "Robust super-resolution," *Proc. IEEE Conference on Computer Vision and Pattern Recognition (CVPR '01)*, vol. 1, 2001, pp. 645-650, uses the same discrete camera model as given in (2). Its robustness is introduced by a robust back-projection, that is based on applying a frame-wise median operation instead of a mean operation. The latter one is often applied by non-robust SR reconstruction methods that use Iterated Back Projection.

An LR representation of the background, obtained by shifting, blurring and down-sampling of the HR background estimate b, can be compared to the corresponding LR frame of the recorded image sequence:

$$\delta_{k,m} = \left( y_{k,m} - \sum_{r=1}^{R} w_{k,m,r} \tilde{b}_{k,r} \right). \qquad (7)$$

Here, the weights $w_{k,m,r}$ represent the blur and down-sample operation, $\sim b_{k,r}$ is the $r^{th}$ pixel of the shifted HR background b in frame k and $y_{k,m}$ is the measured intensity of the $m^{th}$ pixel in frame k. All difference pixels $\delta_{k,m}$ form a residual image sequence in which the moving object can be detected.

First thresholding is performed on the residual image sequence, followed by tracking. Thresholding is done with the chord method disclosed in the paper by G. W. Zack, W. E. Rogers, and S. A. Latt, "Automatic measurement of sister chromatid exchange frequency," *Journal of Histochemistry and Cytochemistry*, vol. 25, no. 7, pp. 741-753, 1977, which method is illustrated in FIG. 5. With this histogram based method an object mask sequence $m_T = \delta_{k,m} > T_\delta$ results for k=1, 2, ..., K and m=1, 2, ..., M with K the number of observed LR frames and M the number of pixels in each LR frame.

After thresholding, multiple detections may occur in each frame of $m_T$. In the present invention, it is preferred to apply tracking to find the most similar detection in each frame to a reference detection. This reference detection is defined by the median width ($W_R$), the median height ($H_R$) and median residual energy ($E_R$) of the largest detection in each frame (median is taken frame-wise). Next, in each frame k the detection with the smallest normalized Euclidian distance $\Delta_k$ (regarding its width $W_{k:i}$, height $H_{k:i}$ and residual energy $E_{k:i}$) to the reference detection is searched for:

$$\Delta_k(\hat{i}) = \min_i \left( \sqrt{\left(\frac{W_{k,i} - W_R}{W_R}\right)^2 + \left(\frac{H_{k,i} - H_R}{H_R}\right)^2 + \left(\frac{E_{k,i} - E_R}{E_R}\right)^2} \right), \quad (8)$$

with $\hat{i}$ the index of the detection in frame k with the smallest normalized Euclidian distance to the reference detection. After this tracking step an object mask sequence $m_{TT}$ results with in each frame at most one detection.

Moving Object Registration

The object mask sequence $m_{TT}$, obtained after thresholding and tracking, gives a pixel-accurate indication of the position of the object in each frame. For performing SR reconstruction, a more precise (sub-pixel) registration is needed. When moving objects contain sufficient internal pixels with sufficient structure or have sufficient contrast with their local background, gradient-based registration can be performed. In the setting of small moving objects this is usually not the case and another approach is needed.

When a motion model for a moving object is known, such a model can be fitted to the object positions in time. We assume a constant motion model in the real world, which seems realistic given the nature of small moving objects: the objects are far away from the observer and will have a small acceleration due to the high frame rate of today's image sensors.

First, an approximately pixel-precise position of the object in each frame is determined by calculating the weighted Centre Of Mass (COM) of the masked pixels. The weighted COM of the masked pixels in frame k is defined by $$a_k = \frac{1}{\sum_{n=1}^{M} m_n \cdot y_{k,n}} \left[ \sum_{n=1}^{M} i_n \cdot m_{k,n} \cdot y_{k,n}, \sum_{n=1}^{M} j_n \cdot m_{k,n} \cdot y_{k,n} \right]^T \quad (9)$$

with M the number of LR pixels in frame k, $(i_n, j_n)$ the (x,y)-coordinate of pixel n, $m_{k,n}$ the corresponding mask value (0 or 1) and $y_{k,n}$ is the measured intensity.

To fit a trajectory, all object positions in time must be known relative to a reference point in the background scene. This is done by adding the previously obtained background translation $s_k$ to the calculated object position for each frame: $\sim a_k = a_k + s_k$.

To obtain all object positions with sub-pixel precision, a robust fit to the measured object positions $\sim a_k$ is performed. Assuming constant motion, all object positions can be described by a reference object position $a_R$ and a translation v. Both the reference object position and the translation of the object are estimated by minimizing the following cost function:

$$C_{a_R,v} = \sum_{k=1}^{K} \left(1 - \exp\left(-\frac{d_k^2(a_R, v)}{2\sigma_i^2}\right)\right), \quad (10)$$

where $d_k$ denotes the Euclidean distance in LR pixels between the measured object position and the estimated object position at frame k:

$$d_k = \|\tilde{a}_k - (a_R + (k-1)v)\|. \quad (11)$$

The cost function in (10) is known as the Gaussian norm. This norm is robust to outliers (e.g. false detections in our case). The smoothing parameter σ is set to 0.5 LR pixel. Minimizing the cost function in (10) with the Levenberg-Marquardt algorithm results in a sub-pixel precise and accurate registration of the moving object. If e.g. 50 frames (K=50) are used, the registration precision is improved with a factor≈7.

Experiments

The SR reconstruction method for small moving objects according to the present invention is tested on simulated data as well as on real-world captured data. The experiments on simulated data show the performance of the method of the present invention under varying, but controlled conditions. Real-world data are used to test the method under realistic conditions and to study the impact of changes in object intensities caused by reflection, lens aberrations and small changes in aspect ratio of the object along the trajectory.

Test 1 on Simulated Data

A simulated under-sampled image sequence containing a small moving car was constructed using the camera model depicted in FIG. 1. Gaussian optical blurring ($\sigma_{psf}$=0.3 LR pixel) and rectangular uniform sensor blurring (100% fill-factor) are used to model the camera blur and Gaussian distributed noise is added. The car describes a linear trajectory with respect to the background and is modelled with two intensities, which both are above the median background intensity. The low object intensity is exactly in between the median background intensity and the high object intensity. The boundary of the car is modelled by a polygon with 7 vertices.

In FIG. 6(b) the simulated car is depicted on an HR grid. The car in this image serves as a ground-truth reference for obtained SR reconstruction results. In the LR image sequence the car covers approximately 6 pixels (all mixed pixels) as can be seen in the upper row of FIG. 6. In the LR domain the Signal-to-Noise Ratio (SNR) of the car with the background is 29 dB and the Signal-to-Clutter Ratio (SCR) is 14 dB.

The SNR is defined as:

$$SNR = 20\log_{10}\left(\frac{\frac{1}{K}\sum_{k=1}^{K}\bar{I}_{fg}(k) - \frac{1}{K}\sum_{k=1}^{K}\bar{I}_{bg}(k)}{\sigma_n}\right), \quad (12)$$

with K the number of frames, $I_{fg}(k)$ the mean foreground intensity in frame k and $I_{bg}(k)$ the mean local background intensity in frame k. $I_{fg}(k)$ is calculated by taking the mean intensity of LR pixels that contain at least 50% foreground and $I_{bg}(k)$ is defined by the mean intensity of all 100% background pixels in a small neighbourhood around the object. The SNR gives an indication on the contrast of the object with its local background compared to the noise level.

The SCR is defined as:

$$SCR = 20\log_{10}\left(\frac{\frac{1}{K}\sum_{k=1}^{K}\bar{I}_{fg}(k) - \frac{1}{K}\sum_{k=1}^{K}\bar{I}_{bg}(k)}{\frac{1}{K}\sum_{k=1}^{K}\sigma_{bg}(k)}\right), \quad (13)$$

with $\sigma_{bg}(k)$ the standard deviation of the local background in frame k. The SCR is a measure of the amount of contrast of the object with the mean local background compared to the variation in the local background.

The result shown in FIG. 6(c) is obtained by applying the pixel-based SR reconstruction approach described in the paper by Van Eekeren et al. mentioned above, with zoom factor 4, using 85 frames for reconstruction of the background and 50 frames for reconstruction of the foreground. The same camera model is used as in the construction of the data.

Using the same data, camera model and zoom factor, the SR reconstruction result after applying the method of the present invention is depicted in FIG. 6(*d*). The parameters used during reconstruction are in step 1: $\lambda_f=10^{-4}$, $\lambda_p=10^{-6}$ and in step 2: $\lambda_f=10^{-3}$, $\lambda_p=10^{-3}$. The object boundary is approximated with 8 vertices, which is one more than used for constructing the data, so the boundary is slightly over-fitted. Comparing the results in FIGS. 6(*c*) and (*d*) shows that the result of the new method bears a much better resemblance to the ground truth reference in FIG. 6(*b*).

Test 2 on Simulated Data

This experiment was carried out on simulated image sequences similar to the one used in the previous experiment. To investigate the performance of the method of the present invention under different conditions, both 1) the clutter (variance) of the local background and 2) the noise level were varied. The clutter of the background was varied by multiplying the background with a certain factor after subtracting the median intensity. Afterwards the median intensity was added again to return to the original intensity domain. The intensities and the size of the car were not changed. The car still covered approximately 6 LR pixels (area) and the minimum object intensity (at the back of the car) was exactly in between the median local background intensity and the maximum object intensity.

Both the HR background and the HR foreground are reconstructed with zoom factor 4 using 85 frames and 50 frames respectively. The camera model used during reconstruction was the same as used during constructing the data. For reconstruction of the moving object the same settings are used as in the previous experiment. The object boundary again was approximated with 8 vertices.

The quality of the different SR results is expressed by a Normalized Mean Squared Error (NMSE) with a ground truth reference $z_{gt}=c_{gt}f_{gt}$ of the object. Note that this measure considers only the foreground intensities, the background intensities are set to zero.

$$NMSE = \frac{1/N \sum_{n=1}^{N}(z_{gt}(n) - z_{est}(n))^2}{\max(z_{gt})^2}, \quad (14)$$

with N the number of HR pixels, $z_{est}$ the estimated foreground intensities of the SR result and $z_{gt}$ its ground truth reference. The normalization is done with the squared maximum intensity in $z_{gt}$.

In FIG. 7 the NMSE is depicted for varying SNR and SCR. The results are divided into three different regions: good (NMSE<0.01), medium (0.01<NMSE<0.03) and bad (NMSE>0.03). For each region a SR result is shown to give a visual impression of the performance. It is clear that the SR result in the 'good region', with a realistic SNR and SCR, bears a good resemblance to the GT reference. Note that the visible background in those SR results is not used to calculate the NMSE. FIG. 7 shows that the performance decreases for a decreasing SNR. Furthermore, the boundary between the 'good' and 'medium' region indicates a decrease in performance under high clutter conditions (SCR<5 dB).

Test on Real-World Data

The data for this experiment were captured with an infrared camera (the 1T from Amber Radiance). The sensor was composed of indium antimonide (InSb) detectors (256×256) with a response in the 3-5 μm wavelength band. Furthermore, optics with a focal length of 50 mm and a viewing angle of 11.2° (also from Amber Radiance) was used. A vehicle (Jeep Wrangler) was captured at 15 frames/second, driving with a continuous velocity (≈1 pixel/frame apparent velocity) approximately perpendicularly to the optical axis of the camera. FIG. 8 shows a top view of this setup. While capturing the data, the platform of the camera was gently shaken to provide sub-pixel motion of the camera. Panning was used to keep the moving vehicle within the field of view of the camera.

The distance was selected such that the vehicle appeared small (≈10 LR pixels in area) in the image plane. In the left column of FIG. 9 a part of a LR frame (64×64 pixels) and a zoom-in on the vehicle are shown. The vehicle was driving from left to right at a distance d of approximately 1150 meters. The SNR of the vehicle with the background is 30 dB and the SCR is 13 dB. In the previous experiment it was shown that for these values the method of the present invention is capable to achieve a good reconstruction. In the right column of FIG. 9 the results after applying SR reconstruction method of the present invention show that this is indeed the case.

The HR background was reconstructed from 85 frames with zoom factor 4. The camera blur was modelled by Gaussian optical blurring ($\sigma_{psf}=0.3$), followed by uniform rectangular sensor blurring (100% fill factor). The HR foreground was reconstructed from 50 frames with zoom factor 4 and the camera blur was modelled in the same way as the background. The object boundary was approximated with 12 vertices and during the reconstruction the following settings are used: $\lambda_f=10^{-4}$, $\|_p=10^{-6}$ in both step 1 and 2.

Note that much more detail is visible in the SR result than in the LR image. The shape of the vehicle is much more pronounced and the hot engine of the vehicle is well visible. For comparison the SR result is depicted in FIG. 10, next to a captured image of the vehicle at a 4× smaller distance. For visualization purposes, the intensity mapping is not the same for both images. So a grey level in (a) may not be compared with the same grey level in (b). This intensity mismatch is explained by the fact that both sequences were captured at a different time, which causes a change in reflection by the sun and heating of the vehicle. The shape of the vehicle is reconstructed very well and the hot engine is located at a similar place.

In summary, the multi-frame SR reconstruction method of the present invention improves the visual recognition of small moving objects under realistic Signal-to-Noise Ratios and Signal-to-Clutter Ratios. It was shown that the method of the present invention performs well in reconstructing a small moving object where state-of-the-art pixel-based SR reconstruction methods fail. The method of the present invention not only performs well on simulated data, but also on a real-world image sequence captured with an infrared camera.

A novel aspect of the SR reconstruction method of the present invention is the use of a combined boundary and intensity description of a small moving object. This makes it possible to simultaneously estimate the object boundary with sub-pixel precision and the foreground intensities from the mixed pixels, which are partly influenced by the background and partly by the foreground.

Another novel aspect of the SR reconstruction method of the present invention is using a hyperbolic error norm on the foreground intensity differences in the cost functional of the inventive SR reconstruction method. This robust error norm permits use of the well-known Levenberg-Marquardt minimization procedure.

The merely exemplary system 100 illustrated in FIG. 11 may be embodied in hardware, in software, or in a suitable mix of hardware and software components. The system comprises a high-resolution background modelling unit 101, an object detection unit 102, an object registration unit 103, a high-resolution object description unit 104, a high-resolution image unit 105, an HR to LR conversion unit 106, a subtraction unit 107, a regularisation unit 108, a cost function unit 109 and a minimisation unit 110.

An input image sequence, which consists of low-resolution images, is fed to the high-resolution background modelling unit 101 to produce an HR (background) model, which in turn is fed to both the object detection unit 102 and the HR image unit 105. The latter produces an HR image which is adjusted by an HR object description produced by the HR object description unit 104, which adjusted HR image is subsequently converted into an LR image by the HR to LR unit 106. The resulting LR image is subtracted from the LR input image sequence by the subtraction unit 107 to produce an LR difference image which in turn is fed to the (cost) function 109, to be discussed below.

The object detection unit 102 receives both the HR background model produced by the unit 101 and the LR input image sequence. The unit 102 detects the object and sends the resulting detection-related data to the object registration unit 103, which registers the object, preferably by fitting a model-based trajectory. The data produced by the object registration unit 103 are fed to the HR object description unit 104 which produces an HR model (that is, description) of the object. This model, which facilitates the identification of objects, is regularised by the regularisation unit 108 and then also input into the (cost) function 109. The minimisation unit 110 minimises the cost function and feeds this minimised cost function to the HR object description unit 104. In this way, a cost function is iteratively minimised to obtain an HR object description.

As mentioned above, the system 100 of the present invention may be implemented as hardware components, as software modules executed by a suitable processor, or as a combination of hardware and software components.

The present invention is based upon the insight that separate models should be provided for foreground and background modelling. The present invention benefits from the further insights that the structure of an object can advantageously be modelled using a polygonal model, and that a combined boundary and intensity description of a small moving object can advantageously be used for SR reconstruction.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of improving the resolution of a moving object in a digital image sequence, the method comprising the steps of:
constructing a high resolution image background model;
detecting the moving object using the high resolution image background model;
registering the object; and
producing a high-resolution object description, wherein the step of producing a high-resolution object description involves an iterative optimization of a function based upon an edge model of the moving object;
subjecting the high-resolution object description to a camera model to produce a low-resolution modeled image sequence;
producing a difference sequence from a registered image sequence and the modeled sequence;
feeding the difference sequence to the cost function; and
minimizing the cost function to produce the next iteration of the polygon description parameter and/or an intensity parameter.

2. The method of claim 1, wherein the object consists mainly or entirely of edge pixels.

3. The method of claim 1, wherein the function is a cost function, and the function is preferably also based upon a high resolution intensity description.

4. The method of claim 1, wherein the edge model is a polygonal model, and wherein the step of registering the object preferably involves a model-based trajectory.

5. The method of claim 1, wherein the high-resolution object description comprises a sub-pixel accurate boundary and/or a high resolution intensity description.

6. The method of claim 1, wherein the step of producing a high-resolution object description involves solving an inverse problem.

7. The method of claim 1, wherein the high resolution image background is estimated using a pixel-based super-resolution method.

8. The method of claim 1, wherein the iterative optimization of a cost function involves a polygon description parameter and/or an intensity parameter.

9. The method of claim 1, wherein the function comprises a regularization term for regulating the amount of intensity variation within the object, preferably according to a bilateral total variation criterion.

10. A computer program product comprising one or more computer readable storage media having stored thereon computer executable instructions that, when executed by a processor, implement a method that improves the resolution of a moving object in a digital image sequence, the method comprising:
constructing a high-resolution image background model;
detecting the moving object using the high-resolution image background model;
registering the object; and
producing a high-resolution object description, wherein the step of producing a high-resolution object description involves an iterative optimization of a function based upon an edge model of the moving object;
subjecting the high-resolution object description to a camera model to produce a low-resolution modeled image sequence;
producing a difference sequence from a registered image sequence and the modeled sequence;
feeding the difference sequence to the cost function; and
minimizing the cost function to produce the next iteration of the polygon description parameter and/or an intensity parameter.

11. The computer program product of claim 10, wherein the object consists mainly or entirely of edge pixels.

12. The computer program product of claim 10, wherein the function is a cost function, and the function is preferably also based upon a high resolution intensity description.

13. The computer program product of claim 10, wherein the edge model is a polygonal model, and wherein the step of registering the object preferably involves a model-based trajectory.

14. The computer program product of claim 10, wherein the high-resolution object description comprises a sub-pixel accurate boundary and/or a high resolution intensity description.

15. The computer program product of claim 10, wherein the step of producing a high-resolution object description involves solving an inverse problem.

16. The computer program product of claim 10, wherein the high resolution image background is estimated using a pixel-based super-resolution method.

17. The computer program product of claim 10, wherein the iterative optimization of a cost function involves a polygon description parameter and/or an intensity parameter.

18. A computer program product comprising one or more computer readable storage media having stored thereon computer executable instructions that, when executed by a processor, implement a method that improves the resolution of a moving object in a digital image sequence, the method comprising:
  constructing a high-resolution image background model;
  detecting the moving object using the high-resolution image background model;
  registering the object; and
  producing a high-resolution object description, wherein the step of producing a high-resolution object description involves an iterative optimization of a function based upon an edge model of the moving object, wherein the function comprises a regularization term for regulating the amount of intensity variation within the object, preferably according to a bilateral total variation criterion.

* * * * *